United States Patent [19]

Hashi

[11] Patent Number: 5,126,546
[45] Date of Patent: Jun. 30, 1992

[54] INFORMATION RECORDING AND REPRODUCING APPARATUS

[75] Inventor: Hiroshi Hashi, Koganei, Japan

[73] Assignee: Olympus Optical Co., Ltd., Tokyo, Japan

[21] Appl. No.: 656,996

[22] Filed: Feb. 15, 1991

[30] Foreign Application Priority Data

Feb. 20, 1990 [JP] Japan .................. 2-39529

[51] Int. Cl.⁵ .......................................... G06K 13/04
[52] U.S. Cl. ................... 235/479; 235/475; 235/478; 235/454
[58] Field of Search ............... 235/449, 454, 475, 478, 235/479

[56] References Cited

U.S. PATENT DOCUMENTS

| | | |
|---|---|---|
| 4,810,863 | 3/1989 | Kachi et al. .................. 235/479 |
| 4,833,310 | 5/1989 | Shimamura .................. 235/479 |
| 5,036,184 | 7/1991 | Sasaki .................. 235/479 |

FOREIGN PATENT DOCUMENTS 62-92268  4/1987  Japan .
64-72373  3/1989  Japan .

*Primary Examiner*—Harold Pitts
*Attorney, Agent, or Firm*—Frishauf, Holtz, Goodman & Woodward

[57] ABSTRACT

An information recording and reproducing apparatus comprising a movable shuttle on which an information recording medium is mounted, a movable head for reproducing or recording information from or on the information recording medium mounted on the shuttle, a shuttle lock mechanism for locking the shuttle, a head lock mechanism for locking the head, and a drive source and a link member for commonly driving the shuttle lock mechanism and the head lock mechanism.

7 Claims, 4 Drawing Sheets

INFORMATION RECORDING AND REPRODUCING APPARATUS

BACKGROUND OF THE INVENTION

1. Field of the Invention

The present invention relates to an information recording and reproducing apparatus for recording and/or reproducing information while driving an information processing head relative to a recording medium and, more particularly, it relates to an information recording and reproducing apparatus provided with mechanisms for locking a shuttle on which the recording medium is mounted and for locking the head respectively.

2. Description of the Related Art

The apparatus disclosed by the Japanese Patent Disclosure Sho 62-92268, for example, is well known as one of the conventional information recording and reproducing apparatuses. This apparatus has a mechanism for locking the shuttle not to be moved by force added to an optical card or recording medium when the card is loaded onto the shuttle in the apparatus. This lock mechanism also serves to prevent the shuttle from being shifted and broken by vibration or the like in the course of carrying the apparatus. The optical head (or head) has a mechanism for allowing it to be reciprocated similarly to the case of the shuttle and it is also subject to impacts in the course of carrying the apparatus. Particularly the optical head includes a plurality of optical members. Even if slight impact is added to the optical head, therefore, the optical axis of these optical members will be shifted from their original one to thereby make it impossible to read or write information from and on the optical card. This makes it necessary to provide a lock mechanism for the optical head.

The conventional information recording and reproducing apparatuses need so many lock drive sources as to correspond to the number of loads which must be locked. As the result, the number of parts used increases accordingly. Further, the apparatus must be made large in size and heavy in weight when so many lock drive sources are incorporated into the apparatus. The Japanese Patent Disclosure Sho 64-72373 discloses another information recording and reproducing apparatus provided with a mechanism for locking the shuttle by a combination of gears. According to this apparatus, the shuttle is unlocked when a solenoid which drives the gears is energized and it is locked when the solenoid is de-energized.

However, this apparatus also leaves the above-mentioned drawbacks unsolved.

SUMMARY OF THE INVENTION

The present invention is therefore intended to provide an information recording and reproducing apparatus capable of reducing the number of parts used to form mechanisms for locking the shuttle and the like.

Additional objects and advantages of the invention will be set forth in the description which follows, and in part will be obvious from the description, or may be learned by practice of the invention The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

An embodiment of the present invention will be described in detail with reference to the accompanying drawings.

Figure 1:
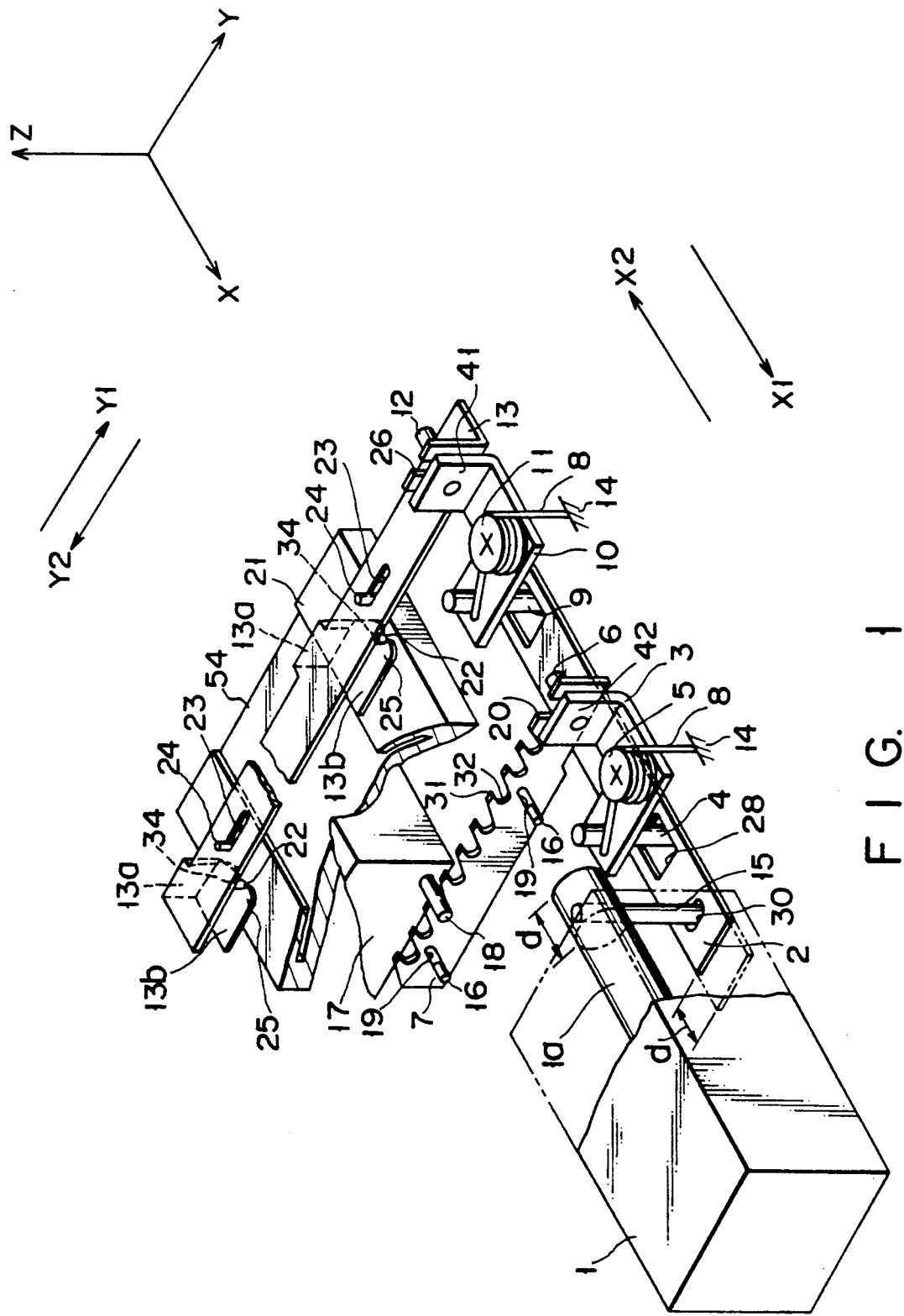
FIG. 1 is a perspective view showing an embodiment of the lock mechanism according to the present invention.
Figure 2:
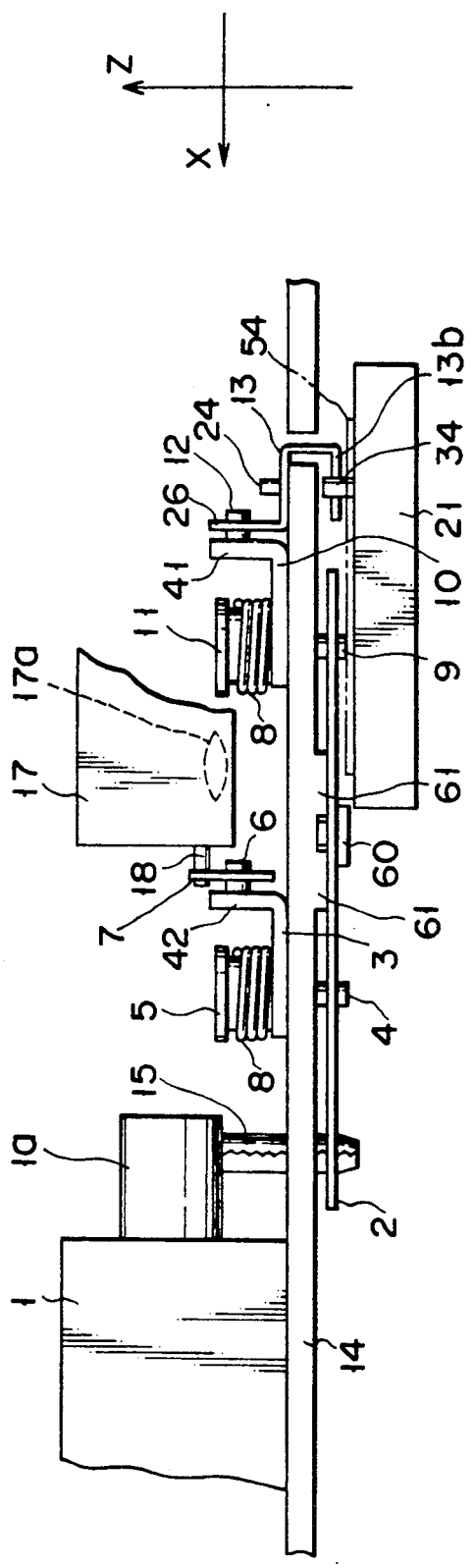
FIG. 2 is a side view showing the lock mechanism viewed in a Y2 direction in FIG. 1.

FIG. 1 is a perspective view showing a mechanism for locking a shuttle 21 and FIG. 2 shows the lock mechanism viewed in a direction Y2 in FIG. 1.

An optical head 17 is supported in such a way that it can reciprocate along a guide rod (not shown) in a direction Y. This optical head 17 includes an optical lens 17a and the like for focusing a flux of light shot from a light source (not shown) onto an optical card 54. A pin 18 is attached to the rear end face of the optical head 17 at the lower portion thereof.

Figure 4A:
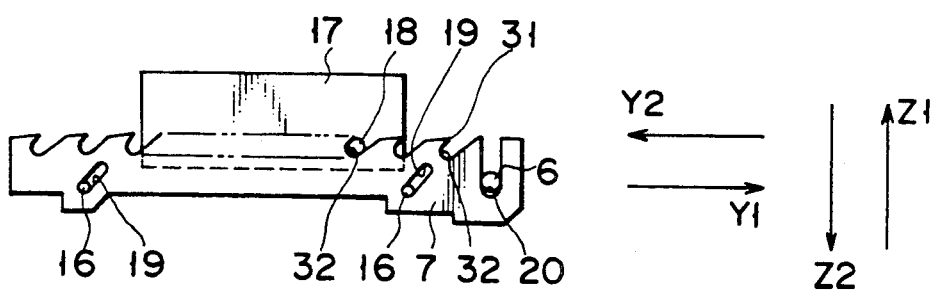
FIG. 4A is a view showing an optical head locked.
Figure 4B:
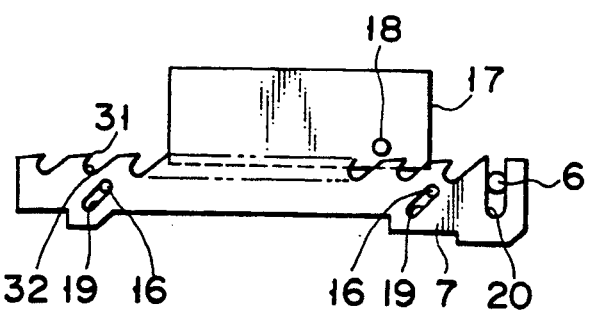
FIG. 4B is a view showing the optical head unlocked.

A head lock 7 is located movable in directions Y and Z, above a frame 14. FIGS. 4A and 4B show the head lock 7 enlarged. A sawtooth-shaped portion which comprises mountains 31 and valleys 32 alternately continuing one another is formed on the top of the head lock 7. The head lock 7 is also provided with a pair of tilted slits 19. A pair of pins 16 fixed to the frame 14 are fitted into the slits 19. When force is applied to the head lock 7 in the direction Y2 in FIG. 4A, the pins 16 and the slits 9 allow the head lock 7 to be moved in both of directions Y2 and Z2 and brought into such a condition as shown in FIG. 4B. When the head lock 7 is under such a state as shown in FIG. 4A, the pin 18 is seated in one of the valleys 32 at the sawtooth-shaped portion of the head lock 7. When the head lock 7 is located as shown in FIG. 4B, the pin 18 is completely released from the sawtooth-shaped portion of the head lock 7.

As shown in FIG. 2, the shuttle 21 on which the optical card 54 is mounted is located under the frame 14. The shuttle 21 is supported in such a way that it can be reciprocated in a direction X by a drive means (not shown). Two pins 34 are symmetrically fixed on the top of the shuttle 21, separating from each other in the direction Y by a certain distance and sandwiching that area of the shuttle 21 on which the optical card 54 is mounted. These pins 34 can be engaged with cut-away portions 22 formed at a pair of bent sections of a shuttle lock 13 which will be later described.

A pair of pins 24 are fixed on the top of the frame 14, separating from each other in the direction Y by a certain distance. Further, the shuttle lock 13 shaped like an elongated plate and extending in the direction Y is located on the top of the frame 14. The shuttle lock 13 is provided with a pair of slits 23 into which the pins 24 are inserted. These slits 23 and pins 24 allow the shuttle lock 13 to be slid on the top of the frame 14 in the direction Y.

Figure 5:
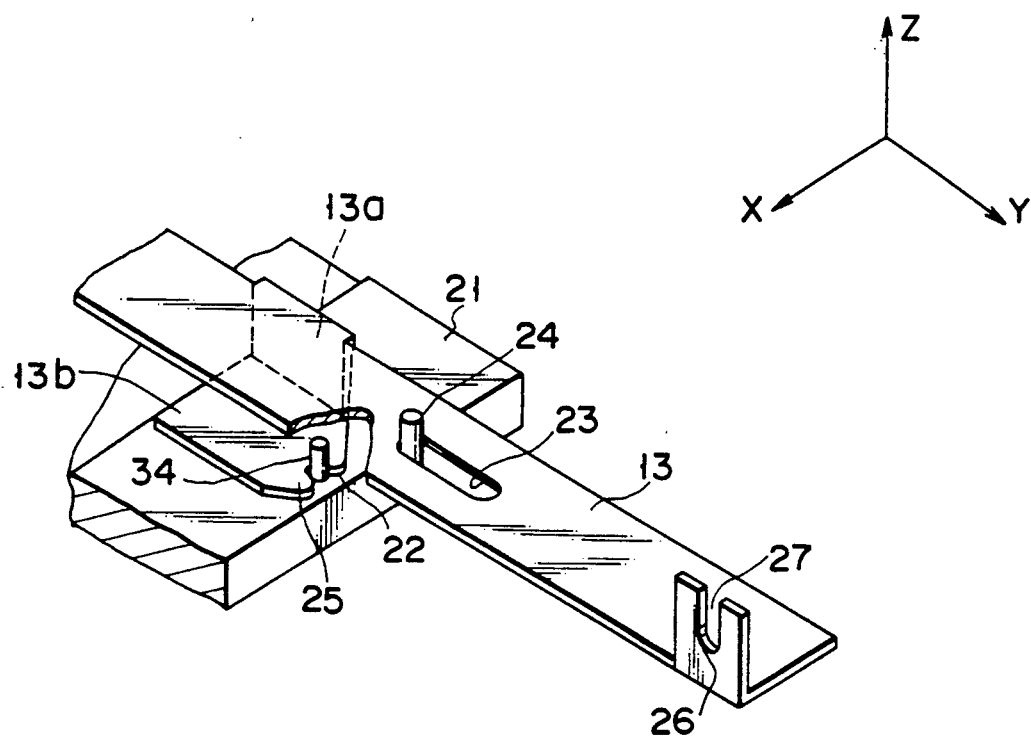
FIG. 5 is an enlarged perspective view showing a shuttle and a shuttle lock.
Figure 6A:
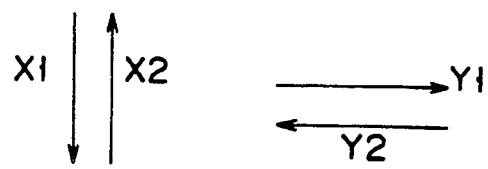
FIG. 6A is a plan view showing the shuttle locked.
Figure 6A:
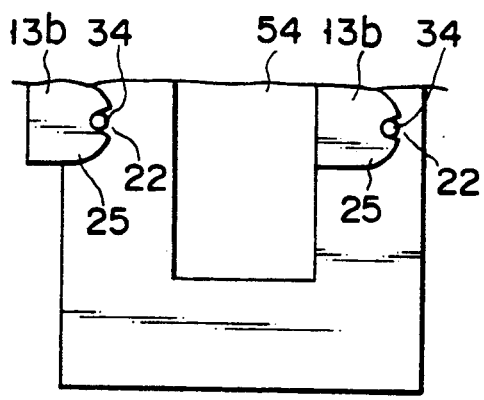

The shuttle lock 13 is bent like an L at two sections thereof to form a pair of the bent sections. Each of the bent sections comprises a side 13a perpendicular to the shuttle lock 13, and a bottom 13b extending from the side 13a in a direction X1 at a right angle. These bottoms 13B are opposed to the top of the shuttle 21. Each of these bottoms 13b is provided at one end thereof with the cut-away portion 22 which can be engaged with the pin 34 on the top of the shuttle 21. Each of these cut-away portions 22 is a W-shaped claw. The pin 34 is engaged with the cut-away portion 22 in FIG. 5. Only one of the bent sections is shown in FIG. 5, but the other pin 34 is also engaged with the cut-away portion 22 at the other bent section (see FIG. 6A). Therefore, the shuttle 21 is locked not to move in the direction X1.

When the shuttle lock 13 moves in the direction Y2, the pins 34 are released from their corresponding cut-away portions 22 and the shuttle 21 is thus unlocked to reciprocate in the direction X. A projection 26 is also erected upward from one side of the shuttle lock 13 at one end thereof and it is provided with a U-shaped cutaway portion 27.

Screws 5 and 11 are fixed on the top of the frame 14, and L-shaped plate pieces 3 and 10 are respectively attached to the screws 5 and 11 to swing round them. A coil spring 8 is wound round each of the screws 5 and 11 and one end of it is fixed to the frame 14. Pins 4 and 9 are passed through one ends of the plate pieces 3 and 10 and fixed there. The other ends of the coil springs 8 are struck against those portions (or one ends) of the pins 4 and 9 which extend upward from the plate pieces 3 and 10. The plate pieces 3 and 10 are applied with the clockwise forces exerted round the screws 5 and 11 by the coil springs 8. The other ends of the pins 4 and 9 are extended downward from the underside of the frame 14 and loosely fitted into rectangular holes 28 and 29 of a link plate 2 which will be later described.

A projection 41 is erected from the other end of the plate piece 10, extending upward parallel to the projection 26 of the shuttle lock 13, and a pin 12 is fixed to the projection 41 to engage with the U-shaped cut-away portion 27 of the projection 26. A projection 42 is erected from the other end of the plate piece 3, extending upward parallel to the head lock 7, and a pin 6 is fixed to the projection 42 to engage with a U-shaped cut-away portion 20 of the head lock 7.

A solenoid 1 is located on the top of the frame 14. A plunger 1a extends from the solenoid 1 and when the solenoid 1 is energized, the plunger 1a is moved in the direction X1 by a distance (d). A pin 15 is fixed to that side of the plunger 1a which is adjacent to the frame 14, and it extends downward, passing through the frame 14.

Figure 3:
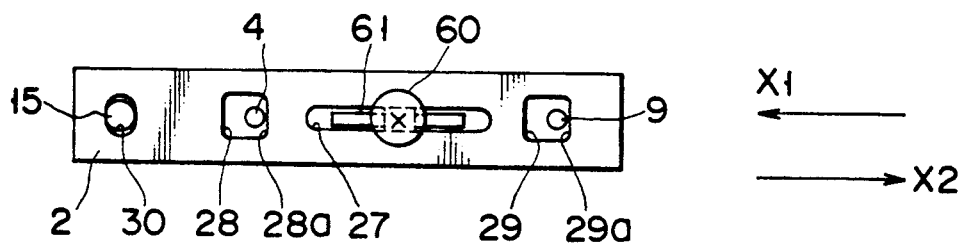
FIG. 3 is an enlarged plan showing a link plate.

The link plate 2 is arranged under the frame 14 and parallel to the frame 14. As shown in FIG. 3, the link plate 2 is a rectangular plate extending in the direction X. The link plate 2 is provided at the left end thereof with a hole 30 into which the pin 15 is inserted. It is also provided at the center and right end thereof with the square holes 28 and 29 into which the pins 4 and 9 are inserted, respectively. Each of the holes 28 and 29 is larger enough than the sectional area of each of the pins 4 and 9. The link plate 2 is provided between the square holes 28 and 29 with a slot 27 which extends in the direction X.

A pair of rectangular projections 61 are projected from the underside of the frame 14 and a screw 60 is fixed between these rectangular projections 61, passing through the slot 27 of the link plate 2. The link plate 2 is thus supported to slide relative to the frame 14 in the direction X. When the plunger 1a moves, therefore, the link plate 2 is slid in the direction X.

The operation of this above-described example will be described.

Description will be made at first on a case where the solenoid is de-energized.

The plunger 1a and the link plate 2 are under such a state as shown by solid lines in FIG. 1. The coil springs 8 urge the plate pieces 3 and 10 clock-wise through the pins 4 and 9. The pins 4 and 9 are under such a state as shown in FIG. 3 in relation to the holes 28 and 29 of the link plate 2. Namely, the pins 4 and 9 are struck against right sides 28a and 29a of the holes 28 and 29.

Force is applied to the plate piece 3 clockwise by the coil spring 8 and force is applied to the head lock 7 in a direction Y1 through the pin 6. As the result, the paired pins 16 fixed to the frame 14 are struck against the lower ends of the slits 19. Namely, the head lock 7 is held while being lifted in a direction Z1. The pin 18 fixed to the optical head 17 is engaged under this state with one of the valleys 32 at the sawtooth-shaped portion of the head lock 7. The optical head 17 is thus locked not to move in the direction Y (see FIG. 4A).

Force is also applied to the plate piece 10 clockwise by the coil spring 8 and force is applied to the shuttle lock 13 in the direction Y1 through the pin 12. The slots 23 of the shuttle lock 13 and the pins 24 fixed to the frame 14 are this time under such a state as shown in FIG. 5. Each of the cut-away portions 22 at the bottom 13b of the shuttle lock 13 is this time engaged with the pin 34 of the shuttle 21, which is thus locked not to move in the direction X (see FIGS. 5 and 6A).

When the solenoid is de-energized, both of the optical head 17 and the shuttle 21 are locked as described above. The optical card 54 is mounted on the shuttle 21 by a loading system (not shown) under this state.

Another case where power is supplied to the solenoid 1 will be described.

When it is detected that the optical card 54 is mounted on the shuttle 21, power is supplied to the solenoid 1 and the plunger 1a is moved in the direction X1 by the distance (d). The link plate 2 is thus moved in the direction X1 by the distance (d) through the pin 15 fixed to the plunger 1a and it is put under such a state as shown by broken lines in FIG. 1.

The pin 4 fixed to the plate piece 3 and the link plate 2 are in such a state that the pin 4 is struck against one side 28a of the square hole 28, as shown in FIGS. 1 and 3. When the link plate 2 is moved, therefore, the plate piece 3 is swung anticlockwise round the screw 5. As the result, the head lock 7 is shifted in the direction Y2 through the pin 6. The two tilted slots 19 of the head lock 7 are engaged with the paired pins 16 fixed to the frame 14, as described above. The head lock 7 is therefore shifted downward or in the direction Z2 as well as in the direction Y2. As the result, the pin 18 is released from one of the valleys 32 of the sawtooth-shaped portion of the head lock 7, as shown in FIG. 4B, so that the optical head 17 can freely move in the direction Y.

When the link plate 2 is moved in the direction X1 by the distance (d) by the plunger 1a, the other plate piece 10 is also swung anticlockwise similarly to the case of the plate piece 3. The shuttle lock 13 is thus shifted in the direction Y2 through the pin 12. As the result, the paired pins 34 fixed to the shuttle 21 are released from the cut-away portions 22 of the bottom 13b, so that the shuttle 21 can freely move in the direction X.

When the solenoid 1 is energized, the optical head 17 and the shuttle 21 which have been kept locked are unlocked at the same time, as described above. The shuttle 21 is reciprocated in the direction X while the optical head 17 in the direction Y by a drive means (not shown). This enables information to be recorded on or recorded information to be reproduced from the optical card 54.

When the recording of information or the reproducing of stored information is finished, the shuttle 21 is moved in a direction X2 and the supply of power is stopped to the solenoid 1. As the result, the plunger 1a is returned to its original position and the shuttle 21 and the optical head 17 are again locked by a process reverse to the above-described one. The optical card 54 is picked up from the shuttle 21 outside the apparatus by the loading system (not shown).

When the solenoid 1 is de-energized in order to lock the optical head 17 and the shuttle 21, there can be a case where the pin 18 of the optical head 17 is struck against one of the mountains 31 of the head lock 17 and fails to enter into that valley 32 which is next to the mountain 32. Namely, there can be a case where the optical head is not sufficiently locked. However when vibration is applied to the apparatus or the apparatus is titled in this case, the pin 18 can be entered into the valley 32 to lock the optical head 17.

Figure 6B:
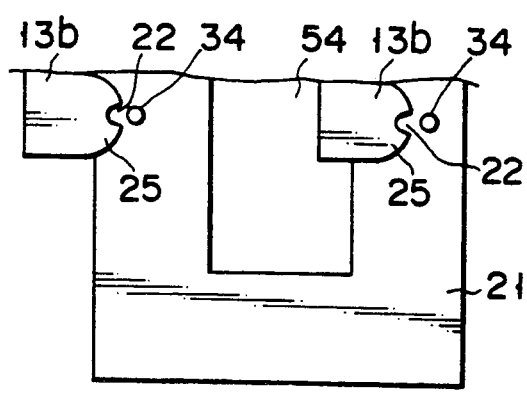
FIG. 6B is a plan view showing the shuttle unlocked.

Similarly, there can also be a case where the cut-away portions 22 of the shuttle lock 13 are not engaged with the paired pins 34 of the shuttle 21 when the solenoid 1 is de-energized. When the apparatus is tilted or so in this case, the shuttle 21 moves due to its own weight so that the pins 34 can be struck against their corresponding W-shaped claws 25. The profile of each of these claws 25 is smoothly curved as shown in FIGS. 5 and 6B. When the pins 34 are struck against the claws 25, therefore, the shuttle lock 13 is shifted to direction Y2 by the pressing force of the pins 34 so that the pins 34 can be engaged with the cut-away portions 22.

Even if the optical head 17 or the shuttle 21 is not sufficiently locked when the solenoid 1 is de-energized, they can be locked, independently of the other, when vibration is applied to the apparatus or the apparatus is tilted, as described above.

According to this example of the present invention, one of the two lock mechanisms is designed to achieve its locking at an optional position of load applied, while the other thereof is designed to achieve its locking only at one point of load applied. However, the present invention can attain its merits whatever combination these two lock mechanisms may have. Further, this example has been intended to achieve its locking by engaging the pins with their corresponding recesses or holes, but this locking may be made by friction created a combination of frictional members and movable members, for example.

According to the present invention, the locking of the optical head and the shuttle can be achieved by one drive system. This enables the number of parts and drive sources used to be reduced. Therefore, the apparatus can be made smaller in size and lighter in weight. In addition, the drive source which causes the temperature in the apparatus to be raised can be located at a specified position. Therefore, the cooling system which is used to lower the temperature in the apparatus can be the smallest in size.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An information recording and/or reproducing apparatus comprising:
   a movable shuttle on which an information recording medium is mounted;
   a movable head for reproducing and/or recording information from and/or on the information recording medium mounted on the shuttle;
   a first lock means for locking the shuttle;
   a second lock means for locking the head; and
   a single drive means for commonly driving the first and the second lock means to lock or unlock the shuttle and head.

2. The information recording and reproducing apparatus according to claim 1, wherein said single drive means includes a link member, a first coupling means for coupling the link member and the first lock means, a second coupling means for coupling the link member and the second lock means, and a drive source for driving the link member thereby driving the first and second lock means.

3. The information recording and reproducing apparatus according to claim 2, wherein said first lock means includes a shuttle lock member connected to the link member and a first holder member for holding the shuttle, and said second lock means includes a head lock member connected to the link member and a second holder member arranged on the head lock member to hold the head.

4. The information recording and reproducing apparatus according to claim 3, wherein said first coupling means has a coupling member for driving the shuttle lock member in a direction different from the direction in which the link member is driven.

5. The information recording and reproducing apparatus according to claim 3, wherein said second coupling means has a coupling member for driving the head lock member in a direction different from the direction in which the link member is driven.

6. An information recording and reproducing apparatus comprising:
   a medium-mounted member on which an information recording medium is mounted;
   a head opposed to the medium-mounted member to reproduce or record information from or on the information recording medium mounted on the medium-mounted member;
   a first lock means for locking the medium-mounted member;
   a second lock means for locking the head;
   a link member for coupling the first and the second lock means;
   a drive source for driving the link member; and a coupling member arranged on the link member to make the first and the second lock means commonly operative in response to the drive source which is turned on and off.

7. An information recording and reproducing apparatus comprising:
   a movable shuttle on which an optical card is mounted;
   a movable optical head for reproducing or recording information from or on the optical card mounted on the shuttle;
   a first lock means for locking the shuttle;
   a second lock means for locking the optical head; and
   a single drive means for commonly driving the first and the second lock means.

* * * * *